United States Patent Office 3,503,871
Patented Mar. 31, 1970

3,503,871
HYDROCRACKING HYDROCARBONS WITH A PLATINUM GROUP METAL CONTAINING LARGE PORE MOLECULAR SIEVE
Elroy M. Gladrow, Edison Township, Middlesex County, N.J., and Paul Thomas Parker, Baton Rouge, La., assignors to Esso Research and Engineering Company, a corporation of Delaware
No Drawing. Filed July 6, 1961, Ser. No. 122,089
Int. Cl. C10g 13/10
U.S. Cl. 208—111                                    13 Claims The present invention relates to the catalytic hydrocracking of hydrocarbons. It is more particularly concerned with a process wherein hydrocarbons are subjected to cracking in the presence of hydrogen and of a large pore zeolitic crystalline molecular sieve having uniform pore openings between 6 and 15 angstrom units and composited, or impregnated with or supporting a platinum group metal or metal compound. Still more particularly, the present invention relates to the cracking of hydrocarbons in the presence of hydrogen and of a large pore molecular sieve supporting or composited with a metal or compound of the platinum group such as platinum, palladium, rhodium, iridium, ruthenium or the like, wherein the alkali metal content of the zeolite support is less than 10% by weight of the support, calculated as the alkali oxide.

Cracking of hydrocarbons in the presence of hydrogen is a well-known petroleum refinery operation and many catalysts have been used or suggested for this purpose. In general, it finds its highest degree of utility in cracking hydrocarbons boiling in the range of heavy naphtha and gas oils, though it also many be used for upgrading, by conversion to gas oil and gasoline, such feeds as heavy gas oils and even higher boiling feed stocks. In general, hydrocracking may be applied to virgin and catalytic naphthas, gas oils, cycle oils and stocks from conventional cracking operations boiling generally in the gas oil range, and alkyl aromatic hydrocarbons in general, as well as straight run heavy virgin naphthas and gas oils. The process is also of interest in hydrodealkylation of alkyl aromatic fractions to lower boiling alkyl aromatic hydrocarbons and to totally dealkylated aromatics.

The hydrocracking process itself consists in passing the feed stock in admixture with hydrogen over the catalyst, if a fixed bed of catalyst is used, or in contact with a moving bed or a fluidized solids bed of catalyst at suitable temperatures, feed rates, pressures, etc., to effect a substantial conversion of the feed stock to lower boiling materials, such as gasoline. Simultaneously, organic nitrogen and sulfur components present in the feed are largely converted to ammonia and hydrogen sulfide respectively. The reaction conditions are to a considerable extent governed by the nature of the feed, the activity of the catalyst, and the nature of the desired end product.

The prior art catalysts that have been employed in this process have not been completely satisfactory for a number of reasons. Some catalysts have been found to be particularly sensitive to the presence of feed impurities, in particular to organic nitrogen. Such catalysts include the metals, oxides and sulfides of iron group metals. These catalysts require frequent regeneration, or maintenance of reaction conditions not conductive to high yields of desirable product. Other catalysts such as noble metals supported on conventional amorophous cracking catalysts, such as silica-alumina, silica-magnesia, silica-alumina-magnesia and the like, have not shown as high an activity as is desirable, and also require regeneration more often than desirable. Many catalysts also have high coke-forming tendencies, and also require relatively high pressures, which is expensive, as well as the requirement of feed purification.

It is the principal object of this invention to provide efficient and selective catalysts for the hydrocracking of hydrocarbon charge stocks to produce lower boiling hydrocarbons, gasoline and/or fuel oils in excellent yield. A further object of the present invention is to provide a catalytic process for hydrocracking petroleum charge stocks with minimum production of dry gas and coke. A still further object of the present invention is to provide a catalyst for the hydrocracking process which is effective at relatively mild conditions, has a long life and does not require feed purification or other feed pretreatment. A specific object of the present invention is to provide a process and catalyst for hydrocracking a wide variety of hydrocarbon charge stocks, including whole crude as well as distillate and residual fractions, in the presence of hydrogen and a decationized large pore zeolitic crystalline molecular sieve supporting or impregnated or composited with a metal or compound of the platinum and palladium series.

Other and further objects and advantages of the present invention will appear more clearly from the detailed specification and claims that follow.

The hydrocracking conditions employed in connection with the catalyst more fully described below involve preferably passing the preheated feed over a fixed bed of catalyst at a temperature between about 550° and 1000° F., pressures between 0 and 2000 p.s.i.g., preferably between about 200 and 1200 p.s.i.g., and space velocities ranging between 0.6 and 10.0 weights of feed per weight of catalyst per hour. Preferred hydrogen rates may range between 750 and 25,000 s.c.f. per barrel of hydrocarbon feed. It is understood that a moving bed, slurry, or a fluidized catalyst bed may also be employed.

In accordance with the present invention there is employed as an outstanding hydrocracking catalyst a composition comprising a metal or compound of the platinum group deposited on, composited with, or incorporated within a crystalline silica-alumina anionic network which has uniform size pore openings between about 6 to 15 angstrom units.

The uniform size pore openings of the catalyst support is a critical feature of the catalyst of the invention. For example, the so-called Linde 4A type crystalline molecular sieve has pore openings of about 4 angstrom units whereas its calcium base-exchange counterpart has pore openings of about 5 angstrom units. These openings are not large enough to allow the free ingress or egress of branched chain paraffins, olefins, or ring compounds present in a hydrocarbon feed stream. The crystalline nature of the catalyst is important, as the particular crystalline structure will then control the uniformity of the pore openings, and so distinguish it from other crystalline and non-crystalline zeolitic-materials and from amorphous silica-alumina gel catalysts and aluminas. In this regard, then, the actual chemical composition of the support becomes of secondary value compared to the size of the pore openings. By this is meant that the relative amounts of silica and alumina are not of primary importance, though these do play a role in both catalyst stability and activity.

In a crystalline alumino-silicate zeolite the actual structure comprises an anionic network with cations interspersed to allow electrical neutrality. Normally, as prepared, these cations are sodium. In the structure, the amount of sodium present has the same atom content as the aluminum, because the aluminum atom being trivalent needs an additional charge to be present to compensate for its deficiency in relation to the quadrivalent silicon atoms. Thus, for the purposes of the present invention the catalyst support is derived from a molecular sieve having a nominal anhydrous composition of Na$_2$O.Al$_2$O$_3$.xSiO$_2$ where the relative silica content may vary at will, providing the pore size opening of the crystalline material remains in the 6 to 15 angstrom unit region. Normally, for a good hydrocracking process catalyst support, the soda content is too high, but it can be reduced to and acceptable level by base exchanging with a more acceptable cation, such as ammonium or hydrogen ions. This does not preclude the use of other metal cations in this base exchange operation which could serve as catalytic agents in their own right as well as improving the properties of the alumino-silicate crystals as a support.

Molecular sieve type crystalline alumino-silicates characterized by a pore opening of 6 to 15 angstrom units can be prepared having a range of SiO$_2$/Al$_2$O$_3$ mol ratio of from about 2.2/1 to about 6.0/1 and higher. These materials are similar in their (1) adsorptive properties. (2) surface areas and pore volumes, (3) X-ray diffraction patterns, and (4) pore openings. For example, the molecular sieve designated by Linde Co. as 13× comprises normally a SiO$_2$/Al$_2$O$_3$ mol ratio of about 2.7. There has been prepared a zeolite having similar pore openings and direction patterns but with a SiO$_2$/Al$_2$O$_3$ mol ratio as low as 2.2. On the other hand, the natural mineral faujasite has the same structure and other physical properties as the 13× material but has a SiO$_2$/Al$_2$O$_3$ mol ratios over the range 2.2 to 5/1 or higher.

The large pore molecular sieve having pore openings of from 6 to 15 angstrom units and varying silica/alumina rations may be prepared in a manner well known in the art. The principle involved is to have present the proper amount and ratios or silica, alumnia, and sodium hydroxide. These processes are described, for instance, in U.S. 2,882,244 and U.S. 2,971,904. Treatment of a permutitic acid with sodium silicate forms a large pore sieve having a silica/alumina ratio of 3.5 to 1. Faujasite, a natural zeolitic molecular sieve having pore openings of the nature described and a similar X-ray diffraction pattern, has a SiO$_2$/Al$_2$O$_3$ ratio of about 5 to 1. Thus, in general, the large pore sieves may be prepared by having present in the reaction mixture Al$_2$O$_3$ as sodium aluminate, alumina sol and the like; SiO$_2$ as sodium silicate and/or silica gel and /or silica sol; and an alkaline hydroxide, either free and/or in combination with the above components. Careful control should be kept over the pH, the sodium ion concentration of the mix, and the crystallization period, all in a manner known per se.

These large pore sieves are the supports employed in accordance with the present invention, after the sodium content has been decreased by base exchange.

To make a suitable catalyst for hydrocracking most, and in some cases substantially all, of the sodium is removed from the sieve by base exchange operation. One way of doing this is by reacting the sodium sieve with ammonium ions; on calcination, the decationized or "Hydrogen" form of the sieve remains. The presence of some sodium, up to 10%, calculated as Na$_2$O, may be beneficial, more than this causes high dry gas make and coke deposition. The soda content of the sieve support of the present invention lies in the range of 0.5 to 10%, preferably less than 8.5%

The step in which the "hydrogen" form or the NH$_4$ form of the sieve is composited with the noble metal may be in the nature of a wet impregnation or a base exchange reaction. Thus a platinum or palladium salt or an ammonium complex of these elements, for instance, Pt(NH$_3$)$_4$Cl$_2$, ammonium chloroplatinate and many others may be used. The palladium salts such as PdCl$_2$ may also be used, either for impregnation or base exchange. The amount of catalytic metal in the finished catalyst is ordinarily between 0.01 and about 5.0 weight percent, preferably 0.1 to 2.0%.

The catalyst of the present invention may be subject to many variations without departing from its spirit. Though it finds its highest utility when a hydrogen atom replaces the bulk of the sodium atoms in the original sodium alumino-silicate, under certain circumstances it may be desirable to replace the sodium by other elements such as cobalt, nickel, zinc, magnesium, calcium, cadmium, copper, and barium, and employ the resulting crystalline compositions as a support for the platinum group metals. Such materials serve not only as the support for the platinum group metal catalyst, but also possess catalytic activity in their own right. Thus, such catalysts may serve a dual role for specific hydrocarbon conversion reactions. The other metal modifications of the adsorbent may impart greater thermal stability to the noble metal catalyst composite.

Similarly, hydrogen alumino-silicates may be prepared, albeit more laboriously, by exhaustively water washing the alkaline sodium alumino-silicate until the wash effluent has a pH essentially that of wash water. Another less desirable method is the careful washing of the sodium alumino-silicate with copious amounts of dilute acid, such as hydrochloric, acetic, sulfuric and the like. The wash acid must be so dilute that it has a pH greater than about 3.8, and preferably above a pH of about 4.5. In this manner the original alumino-silicate structure is preserved. A lower pH value may destroy the structure.

The process of the present invention may be more fully illustrated by the following examples, which are not, however, intended to be limiting in scope.

Example 1

This example describes the preparation of a typical catalyst that is employed in the process of the present invention. In this example, the silica/alumina ratio of the catalyst support is 2.5 to 1.

This example describes the preparation of a crystalline alumino-silicate adsorbent having uniform pore openings of size large enough to adsorb branched chain hydrocarbons, aromatics and naphthenes. Four hundred thirty-five grams of granular sodium metasilicate

(Na$_2$O·SiO$_2$·5H$_2$O)

comprising approximately 29.1% Na$_2$O and 28.7% SiO$_2$ are dissolved in 1305 cc. H$_2$O at room temperature. While the solution is vigorously stirred, 265 grams of a sodium aluminate solution, comprising 20% Al$_2$O$_3$ and having a solids composition of 3Na$_2$O·2Al$_2$O$_3$, are added. After stirring the dense, thick precipitate for about 5 minutes, 1000 cc. H$_2$O were added to dilute the slurry and facilitate stirring the slurry. Whereas the sodium silicate solution had a Na$_2$O/SiO$_2$ mol ratio of about 0.98/1, the approximate relative composition of the composite slurry was about 5.4 Na$_2$O·Al$_2$O$_3$·4SiO$_2$.

The mixture is heat soaked at 180° to 210° F. for ten days. After cooling, the crystalline slurry is filtered, washed with water, and oven dried at 275° F. The crystals are then calcined 4 hours at 850° F., and examined for their adsorptive capacity. A weighed sample of the crystals is placed in an evacuated bulb maintained at 210° F., the boiling point of n-heptane. Successive increments of n-heptane are added until the internal pressure in the system reached 500 mm. Hg. It is found that the capacity of the adsorbent in this case is 0.20 cc. n-heptane (as liquid) per gram of adsorbent. When the adsorbate is toluene, the capacity is measured as 0.23 cc. toluene (as liquid) per gram of adsorbent.

A chemical analysis of the crystalline adsorbent shows 47.8% SiO$_2$, 20.2% Na$_2$O, and 32.0% Al$_2$O$_3$. This corresponds to an approximate molecular composition of about Na$_2$O·Al$_2$O$_3$·2.5SiO$_2$.

Example 2

As pointed out above, the silica/alumina ratio of the final crystalline product is in part at least a function of the concentration ratio of these in the solution. Preferably, the amounts of silicate and aluminate solutions employed are such that the ratio of SiO$_2$/Al$_2$O$_3$ in the final mixture is in the range of 2/1 to 10/1. In the present example there is described the preparation of a large pore sieve wherein the silica/alumina ratio is 3.3 to 1.

Five hundred sixty-four grams of granular sodium metasilicate ($Na_2O \cdot SiO_2 \cdot 5H_2O$) comprising approximately 29.1% $Na_2O$ and 28.7% $SiO_2$ are dissolved in 1128 ml. $H_2O$ contained in a vessel of 4-liter capacity. While rapidly stirring the solution, at room temperature, 138 grams of a sodium aluminate solution, comprising 20% $Al_2O_3$ and having a solids composition of 3 $Na_2O \cdot 2Al_2O_3$, are added. When addition of the aluminate solution is complete, stirring is continued for 5 minutes and then 1000 ml. of additional water are added to dilute the slurry and facilitate stirring. The relative composition of the slurry is about 11.3 $Na_2O \cdot Al_2O_3 \cdot 10SiO_2$.

The slurry is heat soaked at temperatures in the range of 185° to 190° F. using a reflux condenser to retain liquid content for 190 hours. The product is cooled, filtered with suction, washed with about 1 liter of water, and dried in an oven at 275° F. An X-ray diffraction pattern of this material was similar to that of the conventional 13X material described in Example 1 and the mineral faujuasite. A chemical analysis of the material reveals that it contains 55.5% $SiO_2$, 28.9% $Al_2O_3$, and 15.6% $Na_2O$ which corresponds to a molecular composition of about 0.9 $Na_2O \cdot Al_2O_3 \cdot 3.3\ SiO_2$.

The crystalline material, after calcining at 850° F. for 4 hours, is weighed out and examined for its adsorptive capacity by the method described in Example 1. When the adsorbate is n-heptane, the capacity of the material is 0.24 cc. n-heptane (as liquid) per gram. When the adsorbate is toluene, the capacity is measured as 0.27 cc. toluene (as liquid) per gram. When the adsorbate is 2-methyl pentane, the capacity is measured as 0.27 cc. 2 methyl pentane (as liquid) per gram of adsorbent.

Example 3

In a vessel containing one liter water are added, with stirring, 500 grams of the sodium alumino-silicate prepared as described in Example 1 and in the form of extruded pellets, 1/16" in diameter. In a separate vessel one lb. $NH_4Cl$ is dissolved in 1500 ml. $H_2O$ and 250 ml. concentrated $NH_4OH$ (28% $NH_3$) added. This mixed solution is added to the aqueous slurry of sieves and the composite stirred intermittently over a 3 hour period. The liquid was removed by decanting and the solid material remaining is washed twice with 500 ml. $H_2O$. This ion-exchange step is repeated two times with fresh $NH_4OH$-$NH_4Cl$ solutions each time. The washed material is dried in an oven at 220° F. The pellets are then placed in a muffle furnace and heated at 400° F. for 2 hours. The temperature is then raised to 550° F. for 4 hours. During this period of heating considerable ammonia is evolved. The temperature is finally brought to 650° F. and held there for 2 hours. A chemical analysis shows 6.5% $Na_2O$, 53.3% $SiO_2$, and 39.5% $Al_2O_3$, corresponding to a molecular composition of about 0.25 $Na_2O \cdot Al_2O_3 \cdot 2.3\ SiO_2$. The calcined material comprises the anhydride of the hydrogen or the decationized form of the alumino-silicate.

Two hundred eighty-six grams of the H-form alumino-silicate are composited with 1% platinum by contacting them with 180 ml. of a solution comprising 2.86 grams of Pt in the form of a soluble platinum salt. This catalyst, comprising 1% Pt on the H-form of the molecular sieve, is dried at 220° F. and is referred to as catalyst "A" in the subsequent examples.

Example 4

One liter of $H_2O$ and 400 grams of the sodium alumino-silicate prepared as described in Example 1 and in the form of 1/16" extruded pellets are admixed. In a separate vessel, 1 lb. cobalt chloride ($CoCl_2 \cdot 6H_2O$) is dissolved in 3900 ml. of a 6.5% solution of ammonium hydroxide. Air is bubbled through this solution while the complex cobalt amine chloride is formed.

Thirteen hundred cc. of the cobalt solution are added to the sieve-$H_2O$ slurry and stirred intermittently for 90 minutes. The liquid is decanted and the pellets remaining are washed twice with 500 ml. $H_2O$. This ion-exchange step is repeated two times, with 1300 ml. of the fresh cobalt amine solution and 1 liter $H_2O$ being used in each treat. The washed material is finally dried in an oven at 220° F. The pellets are then heated for 2 hours at 400° F., followed by 4 hours at 500° F. to decompose the amine complex. Finally the pellets are heated at 850° F. for 16 hours. The resulting pellets now comprise principally the cobalt form of the crystalline alumino-silicate.

Four hundred forty-five grams of the cobalt alumino-silicate are contacted with 450 cc. of a solution comprising 4.5 grams Pt in the form of a soluble platinum salt. After soaking for 30 minutes, the composite is placed in an oven at 220° F. and slowly dried to allow better penetration of the sieves by the platinum containing ions.

This catalyst comprises 1% Pt on the cobalt form of the alumino-silicate molecular sieve and is referred to as catalyst "B" in subsequent examples.

Example 5

The hydrocracking activity of catalyst "A" was evaluated at 650° F. and atmospheric pressure using n-heptane feed. Liquid feed rate was 1.3 v./v./hr. and hydrogen was added at the rate of 27 mols per mol of n-heptane. The operation employed a fixed bed of catalyst. Under these conditions, 17.3% of the feed was cracked to lower molecular weight hydrocarbons. The cracked products comprised about 26% total $C_4$, 61% total $C_5$ as the principal constituents.

Example 6

The hydrocracking activity of catalyst "A" was evaluated further at 850° F. and atmospheric pressure using methylcyclohexane feed. Liquid feed rate was 0.8 v./v./hr. and hydrogen was added at the rate of 27 mols per mole of methylcyclohexane. The operation employed a fixed bed of catalyst. Under these conditions, 39.6% of the feed was cracked to $C_6$ and lighter hydrocarbons. Principal among these cracked products were 26% total $C_4$, and 48% total acyclic $C_6$.

Example 7

The hydrocracking activity of catalyst "A" was evaluated further at 915° F. using a heavy virgin naphtha feed. This naphtha has a boiling range of 200° to 330° F., a gravity of 55.0 degrees API, and an aniline point of 118° F. The naphtha contained 15 vol. percent aromatics, 44 vol. percent paraffins, 41 vol. percent naphthenes, and 40 p.p.m. sulfur. The naphtha was fed over a fixed bed of catalyst "A" at 200 p.s.i.g. pressure using 2600 cubic feet of added hydrogen per barrel of naphtha feed, at a feed rate of 4.0 w./hr./w. Process period was 4 hours. In this operation, 10.1% of the naphtha was converted to products having five or less carbon atoms. These cracked products comprised 64% $C_3$ and 16% $C_4$. The octane number of the $C_6^+$ naphtha product was improved.

Example 8

The hydrocracking activity of catalyst "B" was evaluated at 915° F. in fixed bed operation using a heavy virgin naphtha. This naphtha was described in Example 7. The naphtha was fed at a rate of 4 w./hr./w., with 2600 cf./bbl. added hydrogen. Pressure was 200 p.s.i.g. and process period was 4 hours. In this operation 18.1% of the naphtha was converted to products having five or less carbon atoms. Principal among these cracked products were methane, 28%; $C_3$, 33%; and $C_4$, 28%. The research octane number (clear) of the remaining $C_6^+$ naphtha was increased from 58 to 88 as a result of the catalytic treat.

Example 9

A mixture of sodium aluminate, sodium hydroxide and silica sol was refluxed at about 210° F. in proportion and for a time to produce crystalline sieves having $SiO_2/Al_2O_3$ ratios of about 4 to 5.5. The sodium sieve was thereafter ion-exchanged with $NH_4OH$-$NH_4Cl$ solutions to produce a material having less than 10% soda, and preferably less than about 4%. The extent of base exchange is readily controlled by controlling contact time and number of exchanges. The resulting sieve may now be calcined to decompose the ammonium compound, thereafter reacted with a platinum or a palladium salt, such as ammoniacal $PdCl_2$, dried, pilled and recalcined, or the ammonium sieve may be treated (or reacted) directly with an ammoniacal platinum or palladium salt solution to effect base exchange, filtered, dried, pilled, and then slowly heated and then finally calcined at 650° to 900° F. to form the so-called decationized form of the sieve containing the catalytic agent.

A sieve which had a $SiO_2/Al_2O_3$ ratio of about 5 and which contained 0.5% by weight of palladium was tested for hydrocracking activity with various hydrocarbon feeds.

Example 10

In the example below, the hydrocracking activity of a decationized palladium-containing large pore molecular sieve is compared with the hydrocracking activity of the conventional nickel sulfide in an amorphous silica-alumina gel catalyst. These runs were carried out in a pilot plant, and data below summarize the results after 12 weeks operation.

| Feed | Light Catalytic Cycle Stock | |
|---|---|---|
| | Catalyst | |
| | Pd/large pore molecular sieve | $Ni_3S_2/Al_2O_3$ $SiO_2$ |
| Pressure, p.s.i.g. | 1,500    800 | 1,500 |
| V./v. hr. | 1.0    1.3 | 0.5 |
| Temperature, ° F. | 640    700 | 680 |
| Conversion, percent | 60    60 | 40 |
| Catalyst deactivation rate, ° F./day | 0.3    0.4 | 1 |

The raw cycle stock contains about 50 p.p.m. of organic nitrogen compounds, and the nickel catalyst deactivates rapidly at temperatures above 700° F. Thus the nickel catalyst would have a life of about one month under the above conditions. On the other hand, at 1500 p.s.i.g., the Pd catalyst was not affected by temperature up to 750° F., thus indicating a catalyst life of over a year at these conditions before regeneration is necessary. Furthermore, these data show that the palladium sieve catalyst may be employed at substantially less severe conditions of temperature and pressure than the nickel catalyst without loss of activity.

Example 11

As pointed out previously, one of the big advantages for the palladium catalyst over nickel sulfide on gel silica-alumina catalyst is the lower pressure required. This advantage is shown clearly in the following comparison of the two catalysts using hydrofined light catalytic cycle oil, containing about 2 p.p.m. of nitrogen.

| | Catalyst | | | | |
|---|---|---|---|---|---|
| | Palladium on decationized molecular sieve (large pore) | | | Nickel sulfide/ $SiO_2$-$Al_2O_3$ cracking catalyst | |
| Pressure, p.s.i.g. | 1,500 | 800 | 500 | 1,500 | 800 |
| V./v./hr. | 2.5 | 1.3 | 1.0 | 1.3 | 0.4 |
| Temperature, ° F. | 615 | 645 | 735 | 580 | 750 |
| Conversion, percent | 60 | 60 | 60 | 60 | 50 |
| Deactivation rate, ° F./day | 0 | 0.1 | | 0 | 8 |

The 800 p.s.i.g. operation with palladium catalyst extended over a period of 39 days or 87 equivalent days at 1.0 v./v./hr. During this period of operation, the temperature required for 60% conversion at 1 v./v./hr. increased no more than 10° F.

Example 12

The palladium catalyst appears attractive for producing premium grade motor gasoline compared with the nickel sulfide hydrocracking catalyst, the palladium catalyst being more selective to light products and producing higher quality naphtha. Based on naphtha yields and octane ratings the palladium catalyst appears particularly attractive for producing premium grade motor gasoline.

| | Feed | |
|---|---|---|
| | Raw Cycle Oil | Raw Cycle Oil |
| | Catalyst | |
| | Nickel Sulfide | Palladium |
| | Temperature, ° F. | |
| | 670–750 | 710 |
| | Pressure, p.s.i.g. | |
| | 1,500 | 1,500 |
| | Conversion, percent | |
| | 60 | 60 |
| Product distribution: | | |
| $C_3^-$, wt. percent | 3 | 4 |
| $C_4$, vol. percent | 6 | 13 |
| $C_5/375°$ F., vol. percent | 53 | 53 |
| $C_5/430°$ F., vol. percent | 69 | 61 |
| Product quality, RON plus 3 cc. TEL: | | |
| $C_5/375°$ F. | 93 | 97 |
| $C_5/430°$ F. | 94 | 97 |
| MON plus 3 cc. TEL: | | |
| $C_5/375°$ F. | 88 | 90 |
| $C_5/430°$ F. | 87 | 90 |

Example 13

Because of the high nitrogen content of certain feeds, it has been extremely difficult to hydrocrack these. Nitrogen compounds have been found to decrease the activity of most hydrocracking catalysts very extensively; compensating for this by increasing temperature generally increases the deactivation rate of the catalyst to such an extent that the catalyst cannot be used satisfactorily in a continuous process without regeneration at excessively frequent intervals. However, the catalyst of the present invention has shown itself to be more resistant to the deteriorating effects of nitrogen compounds. With a gas oil produced by coking a residuum petroleum stock, and which contained much more nitrogen than the catalytic cycle stock used in the preceding examples, the palladium catalyst gave 25% conversion at 0.5 v./v./hr., 1500 p.s.i.g. and a temperature of about 800° F. Under these conditions, the conventional type of hydrocracking catalyst (such as nickel sulfide on a silica-alumina cracking catalyst) would become almost immediately completely deactivated. The catalyst of the present invention, however, maintained its activity for at least six days, the extent of duration of the test.

| | Coker gas oil | Light catalytic cycle oil |
|---|---|---|
| Boiling range, ° F. | 450–850 | 400–610 |
| ° API | 20.2 | 29.3 |
| Nitrogen, p.p.m. | 1,340 | 50 |
| Sulfur, wt. percent | 1.07 | 0.38 |

Example 14

To determine whether the exceptional hydrocracking properties of the present catalyst was due to the combination of a noble metal or an active mixed oxide cracking catalyst or whether it was due to the nature of the support, a comparison was made of the activity of the catalyst of the invention with a palladium catalyst supported on a conventional gel-type silica-alumina cracking catalyst. The data below show the substantial superiority of the palladium-composited large pore crystalline molecular sieve catalyst.

and compounds of Groups V-B, VI-B, VII-B and VIII-B, as well as mixtures thereof.

The term "pore openings" referred to above is described more fully in "The Structures of Synthetic Molecular Sieves" by L. Broussard and D. P. Shoemaker, J.A.C.S.

TABLE

| | Catalyst Composition | | | | | | | | | | |
|---|---|---|---|---|---|---|---|---|---|---|---|
| | Pd/Mol. Sieve (Large Pore, Decationized) 0.5% Pd | | | | | Pd on Amorphous Cracking Catalyst, 0.5% Pd on 13% Al$_2$O$_3$. 87% SiO$_2$ | | | | | |
| | Feed [1] | | | | | | | | | | |
| Opperating Conditions | a | a | a | a | b | b | a | a | a | a | b | b |
| Temp., °F | | 612 | 586 | 594 | 593 | 594 | 600 | 600 | 600 | 600 | 600 | 600 |
| Press., p.s.i.g | 980 | 967 | 948 | 950 | 932 | 930 | 1,012 | 1,003 | 998 | 1,003 | 981 | 1,007 |
| Run, hours | 1-38 | 42-62 | 66-85 | 92-110 | 116-182 | 182-206 | 1-38 | 42-62 | 66-85 | 92-110 | 116-182 | 182-206 |
| Feed Rate, v./hr./v | 3.14 | 3.54 | 3.41 | 3.75 | 2.37 | 2.57 | 2.64 | 2.41 | 3.19 | 3.41 | 1.70 | 2.27 |
| Gas Rate (Once-Through), s.c.f.b | 5,150 | 4,570 | 4,740 | 4,320 | 4,140 | 3,820 | 5,200 | 5,720 | 4,310 | 4,040 | 4,900 | 3,680 |
| Product: | | | | | | | | | | | | |
| Gravity, °API | 57.5 | 47.0 | 47.4 | 45.1 | 39.9 | 32.8 | 41.2 | 40.8 | 39.4 | 38.9 | 33.6 | 30.9 |
| Percent D plus L at 400° F | 86 | 58 | 62 | 52 | 31 | 10 | 28 | 24 | 25 | 24 | 7 | 0 |
| Feed Conversion: | | | | | | | | | | | | |
| Actual | 90 | 66 | 73 | 65 | 33 | 15 | 32 | 25 | 41 | 43 | 8 | 0 |
| Corrected to 3 v./hr./v | 91 | 72 | 77 | 73 | 27 | 13 | 28 | 21 | 43 | 47 | 5 | 0 |

[1] a=Hydrofined light catalytic cycle oil; b=Raw light catalytic cycle oil.

Example 15

The hydrocracking activity of the decationized palladium composited large pore sieve was evaluated in another series of runs, comparing its hydrodealkylation activity with that of the more conventional chlorine-treated platinum on alumina catalyst. In the present example the feed is an ethyl benzene-xylene mixture. The results demonstrate the high hydrocracking-hydrodealkylation activity of the catalyst, and suggests its use for preparing benzene and naphthalene from such stocks as catalytic naphthas, cycle oils and other aromatic feeds rich in alkyl aromatics. Typical hydrodealkylation conditions include temperature of 910° to 930° F., pressures of 200 to 285 p.s.i.g., H$_2$/hydrocarbon ratios of about 5, and feed rates of about 0.5 to 1.0 w./hr./w. The catalyst was activated by a three hour hydrogen treatment at 300 p.s.i.g. at 980° F.

In the specific example, the temperature was 910° F, the feed rate 0.5 w./hr./w., the hydrogen partial pressure 180 p.s.i., and the hydrocarbon partial pressure 36 p.s.i.

| | Feed, wt. percent | Yields, Wt. percent on Feed | |
|---|---|---|---|
| | | Pd/H-Sieve | 0.6% Pt/Al$_2$O$_3$ |
| Benzene | 0.6 | 24.3 | 2.2 |
| Toluene | | 25.3 | 5.5 |
| C$_8$ aromatics | 99.4 | 26.4 | 88.3 |
| C$_9$+ aromatics | 0.0 | 0.0 | 0.0 |

The catalyst (Pd/decationized large pore sieve) gave about ten times as much benzene as the conventional platinum/alumina catalyst.

Although the invention finds its highest degree of utility when the sieve is decationized, it will be understood, as pointed out, that beneficial results are also obtained when the sodium cation regularly present is replaced by other cations, including cations of the noble metals. Thus a calcium sieve prepared by base exchanging a large pore sodium sieve with calcium chloride and thereafter composited with a palladium salt and reduced has shown marked hydrocracking activity. The results obtained by hydrocracking with a platinum-supported cobalt sieve have been shown above in Example 8. Further, though there is significant variation in effectiveness among the large pore sieves, and in general the higher the SiO$_2$/Al$_2$O$_3$ ratio the greater the effectiveness, nonetheless substantially all zeolites, synthetic or natural, having pore openings between 6 to 15 angstrom units may be used with effect, when treated in accordance with the herein disclosure. Furthermore, it is within the ambit of the present invention to supply promoters to the noble metal-supported sieves. These may include transition metals, their oxides or sulfides and particularly the metals 82, 1960, 1041-51. By X-ray diffraction measurements it has been found that the synthetic and naturally occurring large pore sieves, irrespective of the SiO$_2$/Al$_2$O$_3$ ratios, have pore openings or pore diameters of essentially the same order of magnitude and ample to admit branched chain and most common cyclic hydrocarbons.

The foregoing invention is subject to many modifications apparent to those skilled in the art. Attention has already been directed to the alternate catalyst preparation technique wherein the platinum group metal may be composited with the ammonium form of the sieve and then calcined. Furthermore, it is important that the sieve base or support be crystalline at the time that it is composited with the platinum group metal or compound, in order to realize the beneficial results of the present invention; the retention of this crystallinity is not necessary in all cases.

What is claimed is:

1. An improved process for hydrocracking hydrocarbon streams to obtain products boiling lower than said hydrocarbon streams which comprises subjecting said hydrocarbons to hydrocracking conditions in the presence of added hydrogen and a catalyst comprising a platinum group metal composited with a crystalline metallo aluminosilicate zeolite having uniform pore openings between about 6 and 15 angstrom units, said zeolite being characterized by a SiO$_2$/Al$_2$O$_3$ mol ratio of between about 4 and 5.5 and containing no more than 10% sodium calculated as Na$_2$O.

2. The process of claim 1 wherein said zeolite contains no more than about 4% sodium calculated as Na$_2$O.

3. An improved process for hydrocracking hydrocarbon streams to obtain products boiling lower than said hydrocarbon streams which comprises subjecting said hydrocarbon stream to hydrocracking conditions in the presence of added hydrogen and a catalyst comprising between about 0.1 to 2.0 wt. percent of palladium composited with a crystalline metallo aluminosilicate zeolite having uniform pore openings between about 6 and 15 angstroms, said zeolite being characterized by a SiO$_2$/Al$_2$O$_3$ mol ratio of between 4 and 5.5, a sodium content between about 0.5 to 4% sodium calculated as Na$_2$O and containing hydrogen cations.

4. An improved hydrocracking process which comprises subjecting a petroleum fraction to hydrocracking at a temperature in the range of 550 to 900° F., a pressure of 200 to 2,000 p.s.i.g., a hydrogen feed rate of 750 to 25,000 s.c.f./b. hydrocarbon feed, in the presence of a hydrocracking catalyst comprising between about 0.1 to 2.0% by weight palladium composited with a crystalline metallo aluminosilicate zeolite having uniform pore openings between about 6 and 15 angstroms, said zeolite being characterized by the $SiO_2/Al_2O_3$ mol ratio of between 4 and 5.5 and containing between about 0.5 to 4% sodium, calculated as $Na_2O$.

5. The process of claim 4 wherein said zeolite has been base exchanged with a hydrogen-containing cation.

6. The process of claim 4 wherein said zeolite has been base exchanged with a cobalt cation.

7. An improved process for hydrocracking hydrocarbon streams contaminated with impurities selected from the class consisting of nitrogen compounds and sulfur compounds to obtain products boiling lower than said hydrocarbon stream which comprises subjecting said hydrocarbon stream to hydrocracking at a temperature between 550 and 1000° F., at a pressure between about 200 and 1500 p.s.i.g. space velocities between about 0.6 and 10.0 weight of feed per weight of catalyst per hour and a hydrogen feed rate of 750 to 25,000 s.c.f./b. of hydrocarbon feed in the presence of a catalyst comprising between about 0.1 to 2.0% by weight of a platinum group metal composited with a crystalline metallo aluminosilicate zeolite having uniform pore openings between about 6 and 15 angstroms, said zeolite being characterized by a $SiO_2/Al_2O_3$ mol ratio of between 4 and 5.5 and containing no more than 4% sodium calculated as $Na_2O$.

8. The process of claim 7 wherein said zeolite has been base exchanged with a cobalt cation.

9. The process of claim 7 wherein said zeolite has been base exchanged with a zinc cation.

10. The process of claim 7 wherein said zeolite has been base exchanged with a nickel cation.

11. The process of claim 7 wherein said zeolite has been base exchanged with a cadmium cation.

12. The process of claim 7 wherein said zeolite has been base exchanged with a hydrogen-containing cation.

13. An improved process for hydrocracking hydrocarbon streams contaminated with impurities selected from the class consisting of nitrogen compounds and sulfur compounds to obtain products boiling lower than said hydrocarbon stream which comprises subjecting said contaminated hydrocarbon stream to hydrocracking conditions in the presence of added hydrogen and a catalyst comprising a platinum group metal composited with a crystalline metallo aluminosilicate zeolite having uniform pore openings between about 6 and 15 angstroms, said zeolite being further characterized by a silica to alumina mol ratio of between 4 and 5.5, and containing no more than 8.5% sodium calculated as $Na_2O$.

References Cited

UNITED STATES PATENTS

| | | | |
|---|---|---|---|
| 2,962,435 | 11/1960 | Fleck et al. | 208—120 |
| 2,971,904 | 3/1961 | Gladrow et al. | 208—120 |
| 2,479,110 | 8/1949 | Haensel | 208—139 |
| 3,130,006 | 4/1964 | Rabo et al. | 23—110 |

DELBERT E. GANTZ, Primary Examiner

ABRAHAM RIMEAS, Assistant Examiner

U.S. Cl. X.R.

208—110, 112